(12) United States Patent
Matsuki

(10) Patent No.: US 8,370,403 B2
(45) Date of Patent: Feb. 5, 2013

(54) FILE MANAGEMENT APPARATUS AND ITS CONTROL METHOD

(75) Inventor: Naoki Matsuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1697 days.

(21) Appl. No.: 11/275,743

(22) Filed: Jan. 26, 2006

(65) Prior Publication Data

US 2006/0174054 A1   Aug. 3, 2006

(30) Foreign Application Priority Data

Jan. 31, 2005   (JP) .................................. 2005-023932

(51) Int. Cl.
  *G06F 17/30*   (2006.01)
(52) U.S. Cl. ..................................... 707/821; 707/999.2
(58) Field of Classification Search .......................... None
  See application file for complete search history.

(56) References Cited

U.S. PATENT DOCUMENTS

| | | | | |
|---|---|---|---|---|
| 6,327,584 | B1 * | 12/2001 | Xian et al. | 1/1 |
| 6,335,742 | B1 * | 1/2002 | Takemoto | 715/781 |
| 6,438,743 | B1 * | 8/2002 | Boehm et al. | 717/122 |
| 2002/0093582 | A1 | 7/2002 | Aoki et al. | |
| 2003/0055905 | A1 | 3/2003 | Nishiyama et al. | |

FOREIGN PATENT DOCUMENTS

| | | |
|---|---|---|
| JP | 5241923 A | 9/1993 |
| JP | 2002207621 A | 7/2002 |
| JP | 2003-051995 | 2/2003 |
| JP | 2003076647 A | 3/2003 |
| JP | 2003-296162 | 10/2003 |
| JP | 2003-304484 | 10/2003 |
| JP | 2003296161 A | 10/2003 |
| JP | 2004078283 A | 3/2004 |

OTHER PUBLICATIONS

Yukihiro Matsumoto, An Introduction to Ruby, Linux magazine, Japan ASCII Corporation, Nov. 1, 2002, vol. 4, #11, p. 153-159, and partial English-language translation thereof.
Japanese Office Action dated Oct. 22, 2010 in corresponding Japanese Application No. 2005-023932.

* cited by examiner

*Primary Examiner* — Anteneh Girma
(74) *Attorney, Agent, or Firm* — Fitzpatrick, Cella, Harper & Scinto

(57) ABSTRACT

A new filename after change is generated based on rules set using a filename setting menu (301), extension format selection menu (302), basic setting menu (303), and format setting menu (304), and is displayed on a new filename list display window (306). In this case, if the new filename is unusable, it is displayed in distinction from other filenames, thus informing the user of it. A file management apparatus can detect in advance whether or not an error may occur upon changing the filename and can notify the user of such error.

4 Claims, 15 Drawing Sheets

FIG. 5

```
┌─ FORMAT SETTING ──────────────────────┐
│  SERIAL NUMBER  [ 0001 ]  [✔] STORE SERIAL NUMBER │
│                   501      502        │
│  PHOTOGRAPHING DATE/TIME              │
│  ┌─────────────────────────────┬───┐  │
│  │ YEAR MONTH DAY              │ ▼ │  │
│  ├─────────────────────────────┼───┤  │
│  │ YY-MM-DD                    │ ▼ │  │
│  └─────────────────────────────┴───┘  │
│  [✔] INSERT DELIMITER                 │
│  [✔] ADD BRANCH NUMBERS TO IDENTICAL FILES │
└───────────────────────────────────────┘
```

503 — YEAR MONTH DAY / YY-MM-DD
504 — INSERT DELIMITER
505 — ADD BRANCH NUMBERS TO IDENTICAL FILES

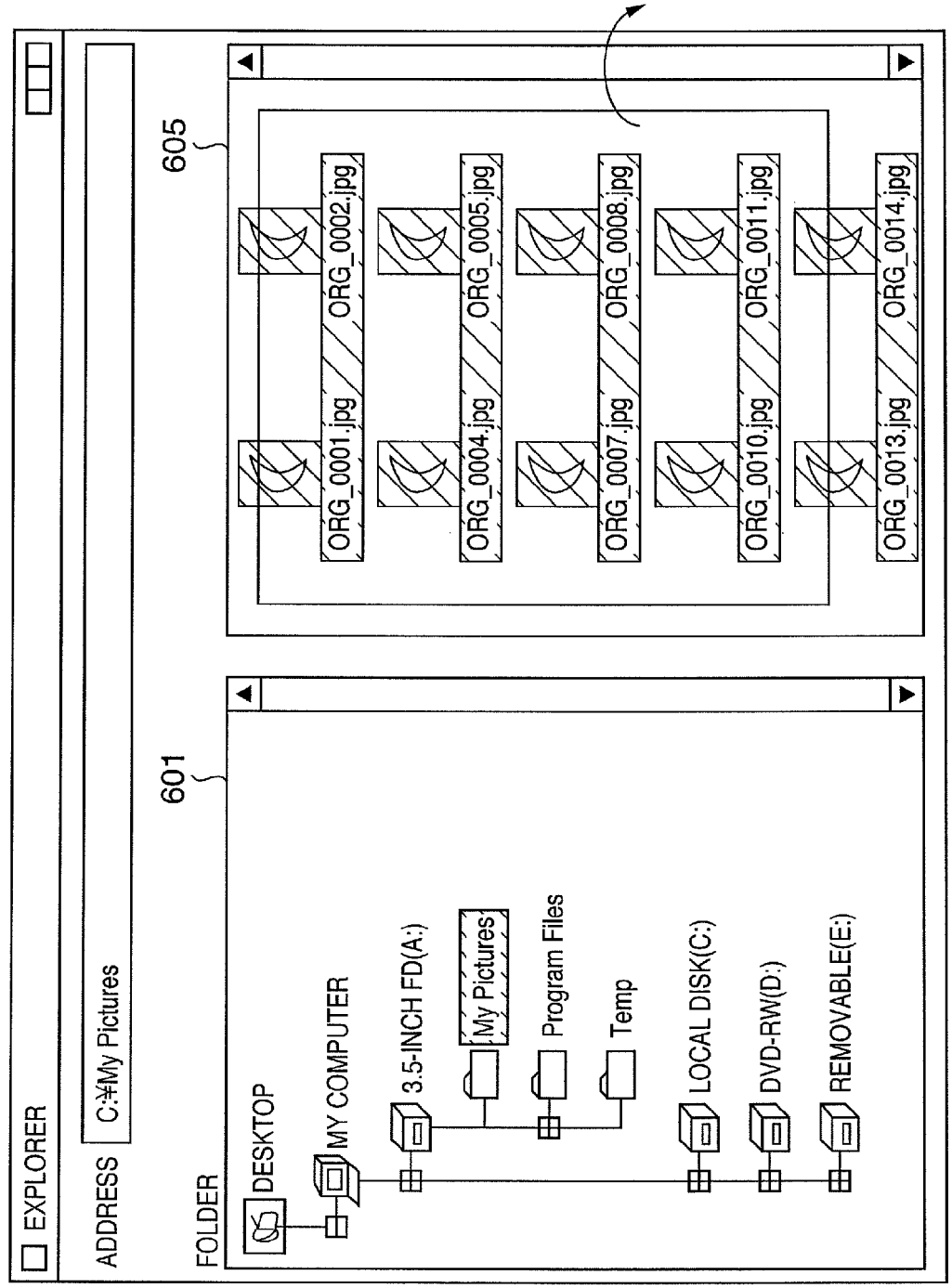

FIG. 6C

RENAME TOOL

FILENAME: ABC

EXTENSION: REMAIN UNCHANGED

BASIC SETTING

SORT: ● FILENAME  ○ PHOTOGRAPHING DATE/TIME

PHOTOGRAPHING DATE/TIME ▶   SERIAL NUMBER ▶

☐ SET SAME FILENAME WITH DIFFERENT EXTENSIONS

☐ COPY AND RENAME    BROWSE...

C:¥My Pictures

FORMAT SETTING

SERIAL NUMBER 0001 ▶ ☑ STORE SERIAL NUMBER

PHOTOGRAPHING DATE/TIME
YEAR MONTH DAY ▶
YY-MM-DD ▶

☑ INSERT DELIMITER
☑ ADD BRANCH NUMBERS TO IDENTICAL FILES

ORIGINAL FILENAME
ORG_0001.jpg
ORG_0002.jpg
ORG_0003.jpg
ORG_0004.jpg
ORG_0005.jpg
ORG_0006.jpg NEW FILENAME
ABC_03-11-03_001.jpg
ABC_03-11-03_002.jpg
ABC_03-11-03_003.jpg
ABC_03-11-03_004.jpg
ABC_04-01-12_005.jpg
ABC_04-01-12_006.jpg

EXECUTION    CANCEL

FIG. 9B

RENAME TOOL

FILENAME: ABC ▶ | PHOTOGRAPHING DATE/TIME ▶ | SERIAL NUMBER ▶ | EXTENSION: REMAIN UNCHANGED ▶

BASIC SETTING

SORT
- ● FILENAME  ○ PHOTOGRAPHING DATE/TIME
- ☐ SET SAME FILENAME WITH DIFFERENT EXTENSIONS
- ☐ COPY AND RENAME

[BROWSE...] C:¥My Pictures

FORMAT SETTING

SERIAL NUMBER [0001]  ☑ STORE SERIAL NUMBER

PHOTOGRAPHING DATE/TIME
YEAR MONTH DAY
YY-MM-DD

☑ INSERT DELIMITER
☑ ADD BRANCH NUMBERS TO IDENTICAL FILES

ORIGINAL FILENAME
- ORG_0001.jpg
- ORG_0002.jpg
- ORG_0003.jpg
- ORG_0004.jpg
- ORG_0005.jpg
- ORG_0006.jpg

NEW FILENAME
- ABC_03-11-03_001.jpg
- ABC_03-11-03_002.jpg
- ABC_03-11-03_003.jpg
- ABC_03-11-03_004.jpg
- ABC_04-01-12_005.jpg
- ABC_04-01-12_006.jpg

[EXECUTION]  [CANCEL]

FIG. 11

RENAME TOOL

FILENAME: ABC ▶ | PHOTOGRAPHING DATE/TIME ▶ | SERIAL NUMBER ▶ | EXTENSION: REMAIN UNCHANGED ▶

BASIC SETTING

SORT
● FILENAME  ○ PHOTOGRAPHING DATE/TIME

☐ SET SAME FILENAME WITH DIFFERENT EXTENSIONS
☐ COPY AND RENAME   [BROWSE...]
C:¥My Pictures

1101

FORMAT SETTING

SERIAL NUMBER [0001]  ☑ STORE SERIAL NUMBER
☑ START SERIAL NUMBERS FOR EACH PHOTOGRAPHING DATE
PHOTOGRAPHING DATE/TIME
YEAR MONTH DAY ▶
YY-MM-DD ▶
☑ INSERT DELIMITER
☑ ADD BRANCH NUMBERS TO IDENTICAL FILES

ORIGINAL FILENAME
ORG_0001.jpg
ORG_0002.jpg
ORG_0003.jpg
ORG_0004.jpg
ORG_0005.jpg

NEW FILENAME
ABC_03-11-03_001.jpg
ABC_03-11-03_002.jpg
ABC_03-11-03_003.jpg
ABC_04-01-12_001.jpg
ABC_04-01-12_002.jpg

[EXECUTION]   [CANCEL]

FIG. 12

RENAME TOOL

FILENAME: ABC ▶ | PHOTOGRAPHING DATE/TIME ▶ | ▶ | EXTENSION: REMAIN UNCHANGED ▶

BASIC SETTING

SORT
- ● FILENAME  ○ PHOTOGRAPHING DATE/TIME
- ☐ SET SAME FILENAME WITH DIFFERENT EXTENSIONS
- ☐ COPY AND RENAME  BROWSE...
- C:¥My Pictures

FORMAT SETTING

SERIAL NUMBER: 0001  ☑ STORE SERIAL NUMBER

PHOTOGRAPHING DATE/TIME
- YEAR MONTH DAY ▶
- YY-MM-DD ▶
- ☑ INSERT DELIMITER
- ☐ ADD BRANCH NUMBERS TO IDENTICAL FILES

ORIGINAL FILENAME
- ORG_0001.jpg
- ORG_0002.jpg
- ORG_0003.jpg
- ORG_0004.jpg
- ORG_0005.jpg
- ORG_0006.jpg NEW FILENAME
- ABC_03-11-03.jpg
- ABC_03-11-03.jpg
- ABC_03-11-03.jpg
- ABC_03-11-03.jpg
- ABC_04-01-12.jpg
- ABC_04-01-13.jpg

[EXECUTION]  [CANCEL]

FILE MANAGEMENT APPARATUS AND ITS CONTROL METHOD

FIELD OF THE INVENTION

The present invention relates to a file management technique for managing a data file and, more particularly, to a technique for changing a filename.

BACKGROUND OF THE INVENTION

Currently, along with the prevalence of digital cameras, digital image files in large quantities are often handled. For example, a professional photographer or the like takes photos in large quantities using a plurality of digital cameras in a single photographing session. Many users want to rename image files by batch processing so as to manage images in large quantities, and many rename applications are available. In such applications, the user can freely set generation rules of new filenames. Also, many rename applications comprise a preview function of changed filenames so that the user can easily confirm the change results of filenames.

In addition to these applications, various file management applications, each of which comprises functions of creating a new file, copying and moving a file, and the like, have functions of avoiding errors that have occurred during execution of various operations.

For example, as disclosed in a method proposed by Japanese Patent Laid-Open No. 2003-296162 (D1), in order to prevent a file from being erroneously erased by wrong overwriting, if a file with the same filename is present at the save destination of a given file, it is checked if they are identical files. If they are identical files, that file is not saved; if they are different files, the name is automatically changed, and the file with the changed name is saved.

The file management applications have various file management methods in correspondence with their purposes intended. For example, according to Japanese Patent Laid-Open No. 2003-51995 (D2), an identical file number is assigned to an image data file and its associated files, and a set of data with the identical file number are managed as a group of data.

In the conventional application, if an error has occurred during processing such as copying, moving, or the like of a file, it alerts the user to seek confirmation of such error, interrupts the processing, or automatically avoids the error. However, there is no application which detects a situation that may cause an error upon processing or informs the user of the detection result before the beginning of execution of the processing.

In an environment in which a plurality of applications can run at the same time, if a plurality of applications that manage files are launched, errors which occur when different applications rename or move an identical file cannot be prevented.

As described in D2, some digital cameras simultaneously generate a plurality of associated files such as audio data and image data. As described in D2, an identical number is assigned to such associated files, and the files are managed using that number. However, when, for example, the user individually changes a filename, the associated files cannot be managed together, thus posing a problem. Especially, a recent digital camera often simultaneously records sensor data (RAW data) and image data (JPEG data) using the same filename but different extensions. Hence, the aforementioned problem stands out (for example, see Japanese Patent Laid-Open No. 2003-304484 (D3).

SUMMARY OF THE INVENTION

The present invention has been made in consideration of the conventional problems, and has as its object to provide a file management apparatus and its control method, which can solve at least one of the aforementioned problems.

According to an aspect of the present invention, there is provided a file management apparatus for changing a filename of a file stored in a storage medium, characterized by comprising: to be renamed file selection means for selecting files specified as files to be renamed from files in the storage medium; rename rule setting means for prompting a user to set rules for generating new filenames; new filename generation means for generating new filenames of the files selected by the to be renamed file selection means in accordance with the rules set via the rename rule setting means; and filename change means for changing the filenames of the files selected by the to be renamed file selection means to the new filenames generated by the new filename generation means, and in that the new filename generation means generates same new filenames except for extensions for a plurality of files having the same filenames except for extensions.

According to another aspect of the present invention, there is provided a file management apparatus for changing a filename of a file stored in a storage medium, characterized by comprising: to be renamed file selection means for selecting files specified as files to be renamed from files in the storage medium; rename rule setting means for prompting a user to set rules for generating new filenames; new filename generation means for generating new filenames of the files selected by the to be renamed file selection means in accordance with the rules set via the rename rule setting means; new filename conflict checking means for checking conflict of the new filenames generated by the new filename generation means; in use filename acquisition means for acquiring filenames of files which are in use by another file management apparatus; and filename change means for changing the filenames of the files selected by the to be renamed file selection means to the new filenames generated by the new filename generation means, and in that when the new filenames include a plurality of identical filenames, or when the same filenames as the filenames of the files selected by the to be renamed file selection means are included in the filenames acquired by the in use filename acquisition means, the new filename conflict checking means determines that the new filenames generated for the files to be renamed are unusable.

According to a further aspect of the present invention, there is provided a file management apparatus for changing a filename of a file stored in a storage medium, characterized by comprising: to be renamed file selection means for selecting files specified as files to be renamed from files in the storage medium; rename rule setting means for prompting a user to set rules for generating new filenames; new filename generation means for generating new filenames of the files selected by the to be renamed file selection means in accordance with the rules set by the rename rule setting means; new filename conflict checking means for checking conflict of the new filenames generated by the new filename generation means; to be generated filename acquisition means for acquiring filenames of files which are planned to be generated by another file management apparatus; and filename change means for changing the filenames of the files selected by the to be renamed file selection means to the new filenames generated by the new filename generation means, and in that when the new filenames include a plurality of identical filenames, or when the same filenames as the new filenames generated by the new filename generation means are included in the filenames acquired by the to be generated filename acquisition means, the new filename conflict checking means determines that the filenames are unusable.

According to yet further aspect of the present invention, there is provided a method of controlling a file management apparatus for changing a filename of a file stored in a storage medium, characterized by comprising: a to be renamed file selection step of selecting files specified as files to be renamed from files in the storage medium; a rename rule setting step of prompting a user to set rules for generating new filenames; a new filename generation step of generating new filenames of the files selected in the to be renamed file selection step in accordance with the rules set via the rename rule setting step; and a filename change step of changing the filenames of the files selected in the to be renamed file selection step to the new filenames generated in the new filename generation step, and in that the new filename generation step includes a step of generating same new filenames except for extensions for a plurality of files having the same filenames except for extensions.

According to still further aspect of the present invention, there is provided a method of controlling a file management apparatus for changing a filename of a file stored in a storage medium, characterized by comprising: a to be renamed file selection step of selecting files specified as files to be renamed from files in the storage medium; a rename rule setting step of prompting a user to set rules for generating new filenames; a new filename generation step of generating new filenames of the files selected in the to be renamed file selection step in accordance with the rules set via the rename rule setting step; a new filename conflict checking step of checking conflict of the new filenames generated in the new filename generation step; an in use filename acquisition step of acquiring filenames of files which are in use by another file management apparatus; and a filename change step of changing the filenames of the files selected in the to be renamed file selection step to the new filenames generated in the new filename generation step, and in that the new filename conflict checking step includes a step of determining, when the new filenames include a plurality of identical filenames, or when the same filenames as the filenames of the files selected in the to be renamed file selection step are included in the filenames acquired in the in use filename acquisition step, that the new filenames generated for the files to be renamed are unusable.

According to another aspect of the present invention, there is provided a method of controlling a file management apparatus for changing a filename of a file stored in a storage medium, characterized by comprising: a to be renamed file selection step of selecting files specified as files to be renamed from files in the storage medium; a rename rule setting step of prompting a user to set rules for generating new filenames; a new filename generation step of generating new filenames of the files selected in the to be renamed file selection step in accordance with the rules set in the rename rule setting step; a new filename conflict checking step of checking conflict of the new filenames generated in the new filename generation step; a to be generated filename acquisition step of acquiring filenames of files which are planned to be generated by another file management apparatus; and a filename change step of changing the filenames of the files selected in the to be renamed file selection step to the new filenames generated in the new filename generation step, and in that the new filename conflict checking step includes a step of determining, when the new filenames include a plurality of identical filenames, or when the same filenames as the new filenames generated in the new filename generation step are included in the filenames acquired in the to be generated filename acquisition step, that the filenames are unusable.

Other objects and advantages besides those discussed above shall be apparent to those skilled in the art from the description of a preferred embodiment of the invention which follows. In the description, reference is made to accompanying drawings, which form a part thereof, and which illustrate an example of the various embodiments of the invention. Such example, however, is not exhaustive of the various embodiments of the invention, and therefore reference is made to the claims which follow the description for determining the scope of the invention.

BRIEF DESCRIPTION OF THE DRAWINGS

FIG. 5 shows details of a format setting menu in FIG. 3;

FIGS. 6A to 6C are views for explaining an example of a method of specifying a file to be renamed in the file management apparatus according to the first embodiment of the present invention;

FIG. 11 shows another mode of the format setting menu in FIG. 3; and

FIG. 12 is a view for explaining a display example upon detection of an error in the new filename check processing in the embodiment.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

<<First Embodiment>>

Figure 1:
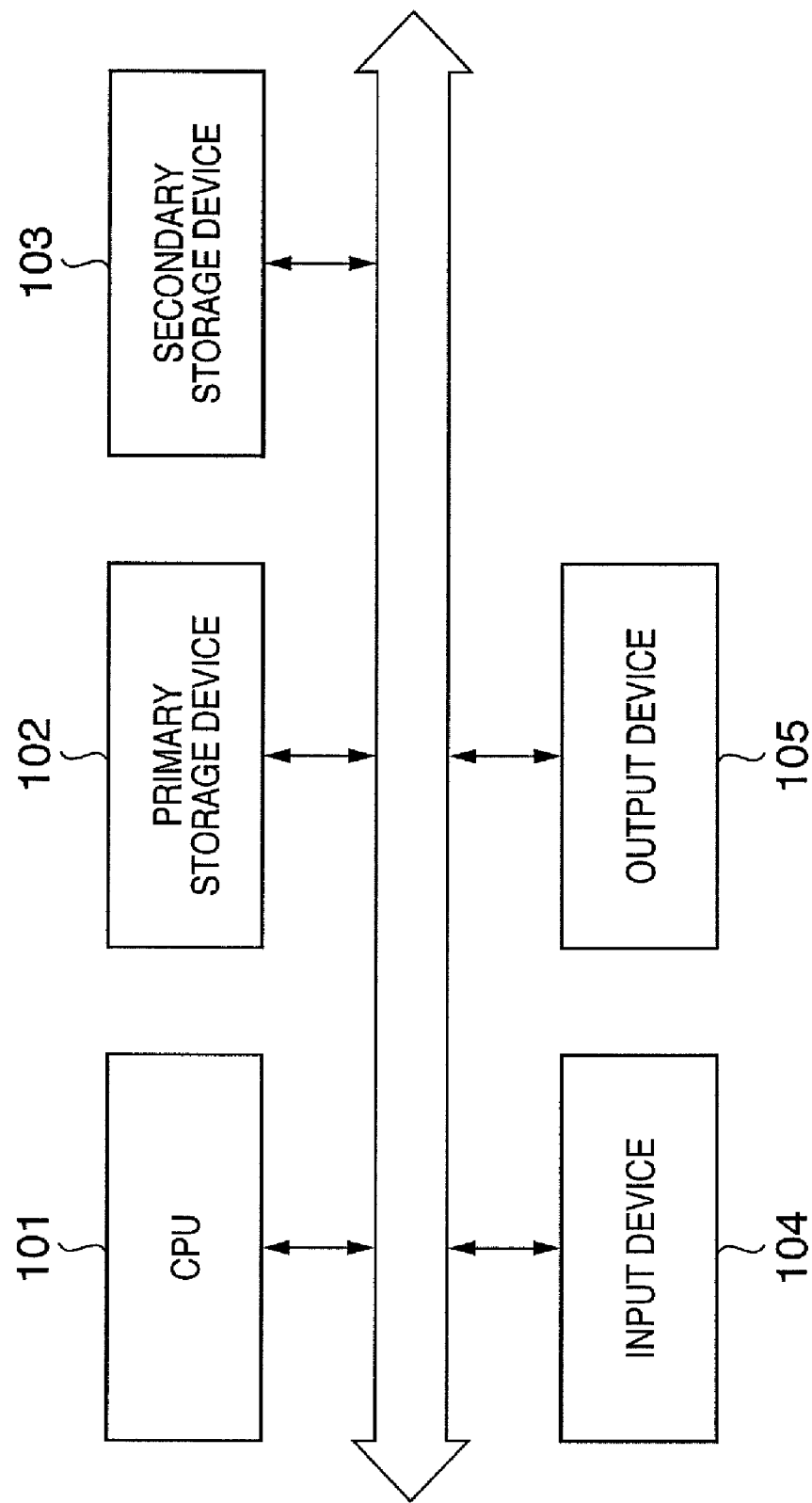
FIG. 1 is a block diagram showing an example of the arrangement of a file management apparatus according to an embodiment of the present invention.

FIG. 1 is a schematic block diagram showing the arrangement of a file management apparatus according to the first embodiment of the present invention. Referring to FIG. 1, a CPU 101 controls the operation of the overall apparatus, and executes programs stored in a primary storage device 102.

The primary storage device 102 is mainly a semiconductor memory such as a RAM or the like, and is used as a so-called work memory that stores programs and the like stored in a secondary storage device 103. The secondary storage device 103 corresponds to, e.g., a hard disk or the like. In general, the capacity of the primary storage device is smaller than that of the secondary storage device, and programs and data which are larger than the primary storage capacity are stored in the secondary storage. Also, data which must be stored for a long period of time is stored in the secondary storage. In this embodiment, a control program to be executed by the CPU 101 is stored in the secondary storage device 103 and is loaded onto the primary storage device 102 when it is executed, and the CPU 101 performs execution processing of the program.

An input device 104 includes, e.g., a mouse, keyboard, and the like. The user uses such input device 104 to give various instructions to the file management apparatus and to send an interrupt signal to a program or the like.

An output device 105 includes, e.g., a display device, printer, and the like.

As described above, the file management apparatus according to this embodiment can be implemented by executing a control program (file management application) by a known general-purpose computer apparatus. Therefore, in the following description, the file management apparatus is also called a file management application.

The file management apparatus of this embodiment displays a GUI used to specify a file to be renamed, and rules of a new filename on a display device, and receives specifications from the user. Furthermore, the file management apparatus according to this embodiment has a preview function of displaying a list of original filenames and new filenames. The GUI data is stored in, e.g., the secondary storage device.

Figure 2:
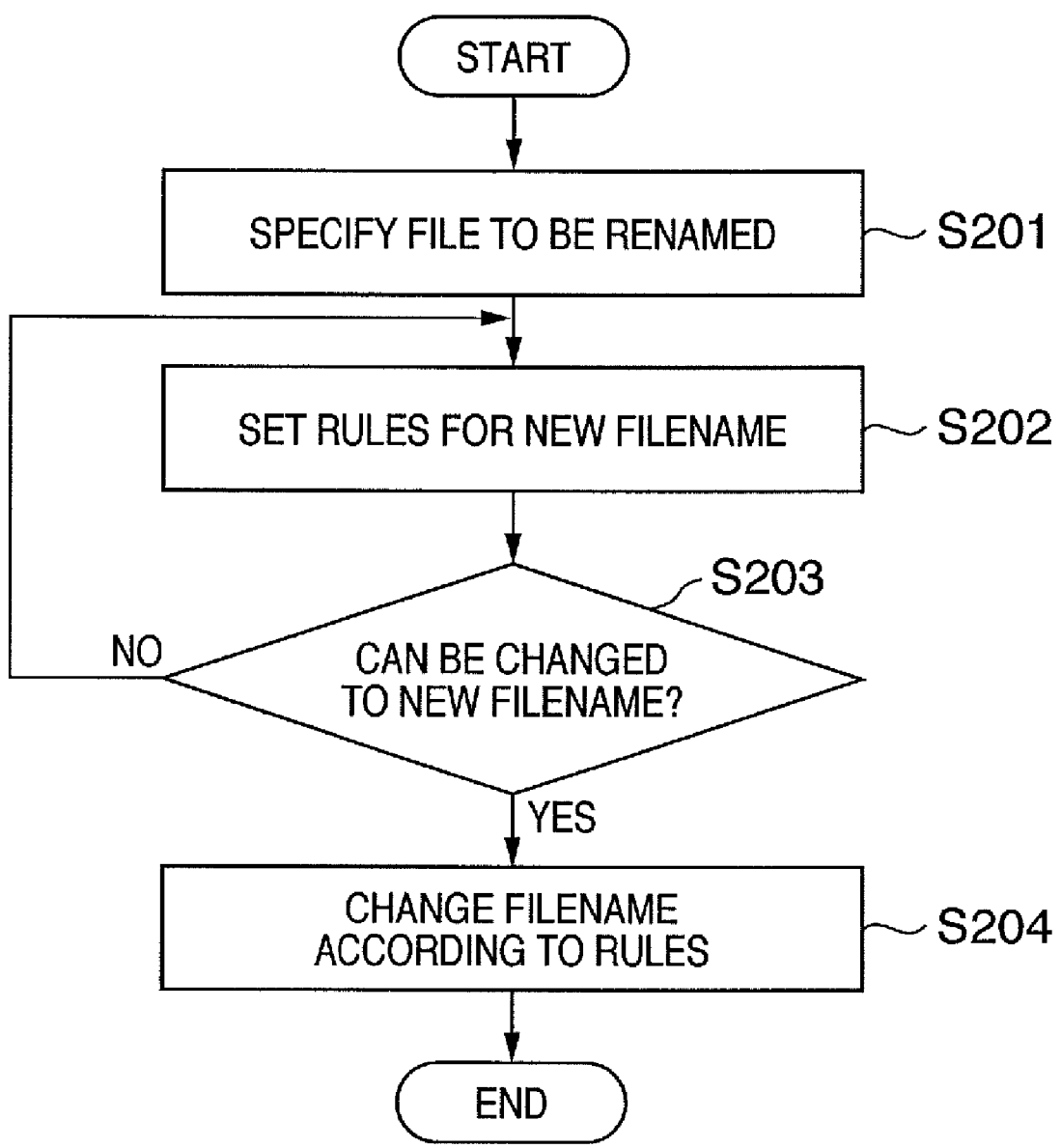
FIG. 2 is a flowchart showing the basic flow of filename change processing of the file management apparatus according to the embodiment of the present invention.

FIG. 2 is a flowchart showing the basic flow of the filename change processing (to be referred to as rename processing hereinafter) in the file management apparatus according to this embodiment.

In step S201, the CPU prompts the user to specify a file to be renamed. In step S202, the CPU prompts the user to set rules of a new filename to be assigned, and generates a new filename based on the set rules. It is checked in step S203 if the filename of the file to be renamed can be changed to the new filename generated in step S202. If the file of the file to be renamed can be changed, the flow advances to step S204. Otherwise, the flow returns to step S202, and the CPU prompts the user to re-set the rules. Finally, the filename is changed actually in step S204. The processes in respective steps will be described in detail below using the drawings.

Figure 3:
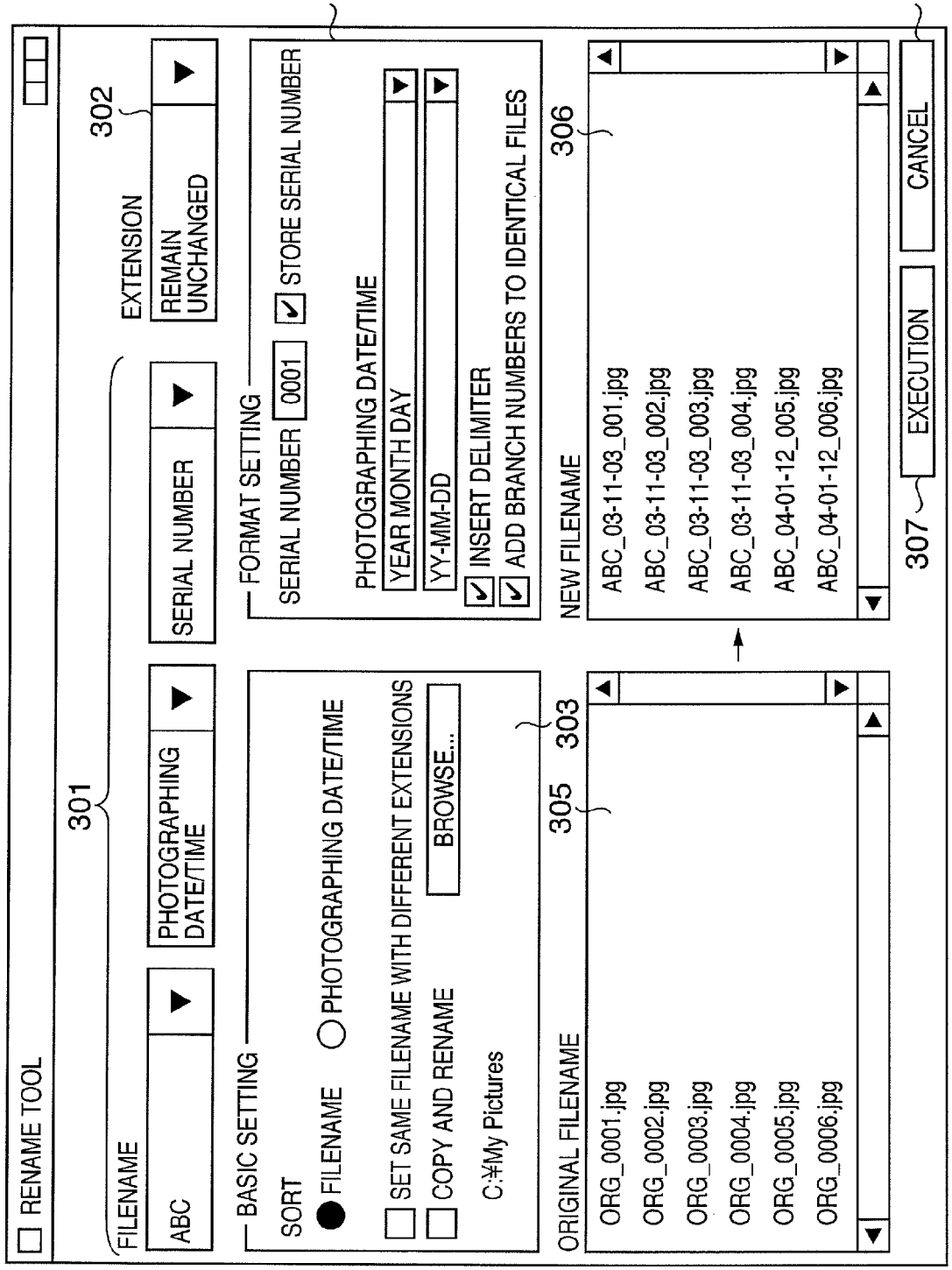
FIG. 3 shows an example of a GUI presented in the filename change processing by the file management apparatus according to the embodiment of the present invention.
Figure 4:
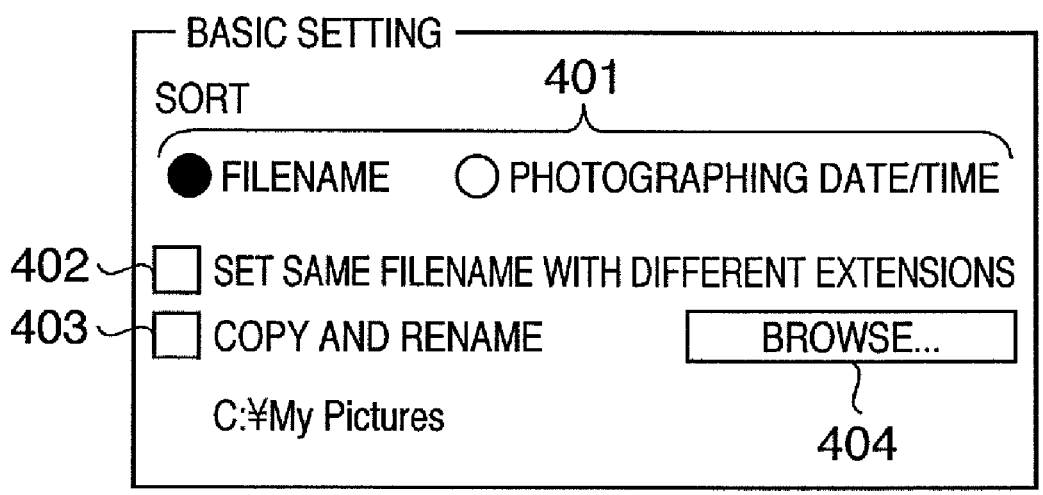
FIG. 4 shows details of a basic setting menu shown in FIG. 3.

FIGS. 3 to 5 show an example of a GUI (rename setting window) to be displayed by the file management apparatus of this embodiment in the rename processing. FIG. 3 shows the entire rename setting window, FIG. 4 shows details of a basic setting menu 303 of the rename setting window, and FIG. 5 shows details of a format setting menu 304.

The user manipulates such rename setting window using the input device 104 such as a keyboard, mouse, and the like. The user can give instructions such as specification of a file to be renamed, settings of generation rules of a new filename, execution or cancel of rename processing, and the like to the file management apparatus. In this embodiment, setting values of items that the user can set on the rename setting window are stored, and the state finally set by the user may be resumed and displayed in the second or subsequent launch of the application.

Figure 6A:
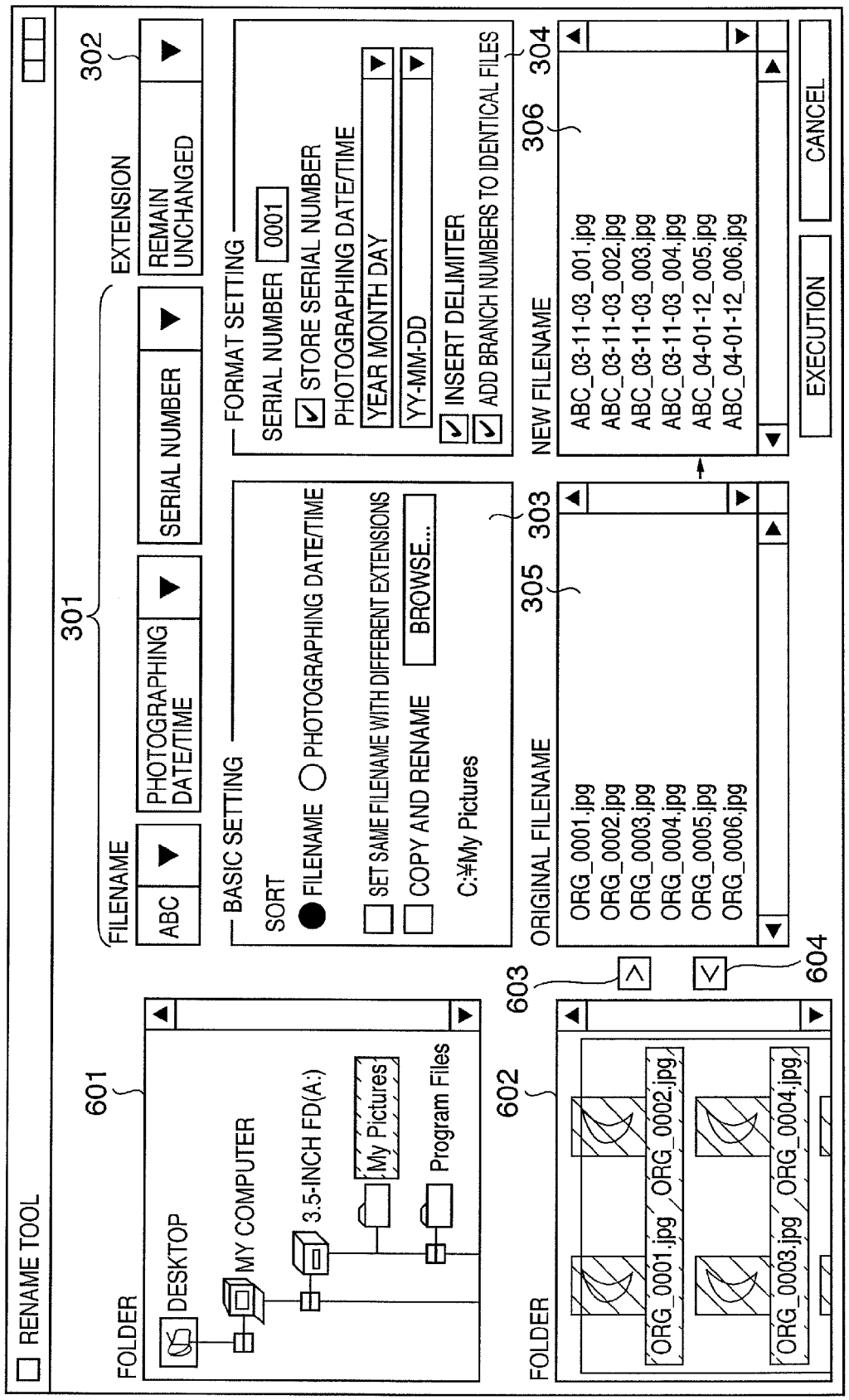

FIGS. 6A to 6C are views showing examples of methods of specifying a file to be renamed by the user. Specification of the file to be renamed is implemented by one or a combination of the methods shown in FIGS. 6A and 6B/6C.

FIG. 6A shows the rename setting window in FIG. 3 to which a folder tree window 601, file list display window 602, add file button 603, and delete file button 604 are added. The folder tree window 601 displays a tree indicating the hierarchical directory structure built in a storage medium which is accessible by the file management apparatus. Such storage medium includes the secondary storage device 103, a semiconductor memory card connected via an interface (not shown), and a storage device connected to another apparatus. Such directory display can be easily implemented by a function provided as one of APIs (Application Programmable Interfaces) that can be accessed from general applications in a general GUI-based operating system (OS).

The user can select and specify a directory where the file to be renamed is stored by tracing the directory tree displayed on the folder tree window 601. The CPU 101 of the file management apparatus updates the display of the folder tree window 601 in accordance with the operation of the input device 104. Furthermore, the CPU 101 displays a list of files or folders, which are included in the directory (folder) selected on the folder tree window 601, on the file list display window 602. In the example of FIG. 6A, files are displayed on the file list display window 602 by means of icons. Alternatively, a plurality of display methods (e.g., a list display of filenames and the like) that can be normally selected upon browsing and displaying files can be applied as needed.

Upon depression of the add file button 603 while a given file is selected on the file list display window 602, the CPU 101 adds the filename of the selected file to an original filename list display window 305. Depression of the button can be determined by detecting, e.g., mouse clicking while the button is specified by a mouse pointer.

At the same time, the CPU 101 generates a new filename on the basis of rules set by a filename setting menu 301, an extension format selection menu 302, the basic setting menu 303, and the format setting menu 304. The CPU 101 then additionally displays the new filename on a new filename list display window 306 (step S202). Likewise, upon depression of the delete file button 604 while the filename is selected on the original filename list display window 305, the CPU 101 deletes the selected filename from the original filename list display window 305. At the same time, the CPU 101 deletes the new filename in the new filename list display window 306, which corresponds to the deleted filename.

The folder tree window 601 and a file list display window 605 in FIG. 6B are provided by a file management system of the operating system used by the file management apparatus of this embodiment. Or when the file management apparatus of this embodiment is to be implemented as an application, these windows are provided by the file management system of the operating system on which that application runs. As in FIG. 6A, the user can select a directory where the file to be renamed is stored from this folder tree window 601, and can display a list of filenames of files included in that directory on the file list display window 605.

In this way, the rename setting window (FIG. 6C) is provided by the file management application, and the file to be renamed specifying window is provided by another application (including the OS) in some cases. In such case, the CPU 101 of the file management apparatus acquires information of the file to be renamed using a known application-to-application communication technique, and displays it on the original filename list display window 305.

More specifically, the user selects the file to be renamed or folder on the file list display window 605, and drags and drops it on an arbitrary area of the rename setting window shown in FIG. 6C. In response to this operation, the application that provides the file list display window 605 notifies the file management application of the information of the dragged and dropped file. As a result, the file management application can additionally display the filename of the file selected by the user on the original filename list display window 305. After that, as in case of FIG. 6A, a new filename is generated based on the set rules, and is additionally displayed on the new filename list display window 306.

In either of FIGS. 6A and 6B/6C, when the user specifies a folder on the file list display window 605, it is determined that all files in that folder are specified, and these files are added to the original filename list display window 305. If that folder includes another folder, the similar processing is repeated. Note that this repetition may quit after an arbitrary number of times of repetitions.

The new filename generation processing in step S202 will be described below.

As described above, the file management apparatus of this embodiment generates a new filename according to rules set on the rename setting window.

More specifically, a new filename is generated based on rules set on the filename setting menu 301, extension format selection menu 302, basic setting menu 303, and format setting menu 304.

On the filename setting menu 301, the framework of rules of a new filename is generated. The filename setting menu 301 includes a plurality of drop-down lists. Each drop-down list is a GUI which includes a combination of a text box and pull-down menu, and on which a value selected from the pull-down menu is input to the text box. An array of values set using the drop-down lists define a rule of a new filename. Specification of a value from each drop-down list can adopt a method of specifying a character string directly input from the input device 104 as a value in addition to a method of selecting a desired item from a list displayed by the pull-down menu.

In this embodiment, the filename setting menu 301 is composed of three drop-down lists which allow the filename to include "arbitrary character string", "photographing date/time", and "serial number".

In FIG. 3, when the left "arbitrary character string" drop-down list is selected, the CPU 101 displays that value so that it can be edited using the input device 104. Note that characters which are determined by the operating system not to be used in a filename are inhibited from being input. When the central "photographing date/time" drop-down list is selected, if the file to be renamed is a photo (photograph image), the photographing date/time is inserted into the new filename. In this case, if the file to be renamed is not a photo, the last update date/time is inserted into the new filename. Whether or not the file to be renamed is a photo (photograph image) can be detected from the file header. Upon selection of the right "serial number" pull-down list, a serial number in the order of display on the original filename list display window 305 is inserted into the new filename. When the "photographing date/time" and "serial number" are selected, the character string of the drop-down list is inhibited from being edited.

The extension format selection menu 302 is used to set an extension format of the new filename. The extension format selection menu 302 includes a pull-down menu which allows the user to select one of options "remain unchanged", "in uppercases", and "in lowercases". If "remain unchanged" is selected, the extension of the file to be renamed is used as that of the new filename intact. If "in uppercases" is selected, the extension of the file to be renamed, which is described in uppercases, is used as that of the new filename. If "in lowercases" is selected, the extension of the file to be renamed, which is described in lowercases, is used as that of the new filename.

The setting items of the basic setting menu 303 will be described below using FIG. 4.

A sort key selection menu 401 includes exclusive radio buttons, and is used to select how to sort the list of filenames displayed on the original filename list display window 305. In this embodiment, one of "filename" and "photographing date/time" is selectable. When "filename" is selected, filenames of files to be renamed are displayed on the original filename list display window 305 while being sorted in ascending order of filename. Likewise, when "photographing date/time" is selected, if files to be renamed are photograph image files, filenames of files to be renamed are displayed on the original filename list display window 305 while being sorted in ascending order of photographing date/time. If files to be renamed are not photograph image files, filenames of files to be renamed are displayed while being sorted in ascending order of last update date.

A "same filename with different extensions mode" selection check box 402 is provided to make the user specify the method of assigning new filenames for files to be renamed such as RAW data, JPEG data, and the like, which have the same filename except for their extensions. If the "same filename with different extensions mode" selection check box 402 is not checked, the same filename with different extensions mode is turned off, and no special processing is made. If the "same filename with different extensions mode" selection check box 402 is checked, the same filename with different extensions mode is turned on, and new filenames for files to be renamed which have the same filename except for their extensions are generated to have the same new filename except for their extensions.

An execution time operation selection check box 403 is provided to make the user select a execution time operation. If the execution time operation selection check box 403 is not checked, a copy destination folder selection button 404 is disabled. Upon execution, the filename of the file to be renamed itself is changed to a new filename generated according to the set rules. If the execution time operation selection check box 403 is checked, the copy destination folder selection button 404 is enabled. If the copy destination folder selection button 404 is pressed, the same window as the specifying window of the file to be renamed is displayed to prompt the user to select a copy destination folder. Upon execution, the file to be renamed is copied to the selected folder to have a new filename.

Setting items of the format setting menu 304 will be described below using FIG. 5.

A start number setting text box 501 and serial number storage specifying check box 502 are used to set the format of serial numbers to be inserted when "serial number" is specified on the filename setting menu 301. The start number setting text box 501 allows to input a numerical value. A value input to this text box 501 is recognized as an initial value (start value) and the number of digits of the input numerical value is recognized as that of serial numbers. That is, for example, if "0001" is input, it is recognized that serial numbers are generated to have the initial value="1" and the number of digits=4. As a result, serial numbers like "0001", "0002", . . . , "0999", "1000", "1001", and the like are inserted into new filenames.

The serial number storage specifying check box 502 is used to select the initial value of the start number setting text box 501 at the time of the next startup. If the serial number storage specifying check box 502 is checked, the last value and the number of digits of the inserted serial numbers are stored at the time of completion. At the time of the next startup, a value obtained by adding "1" to the stored value is set as the initial value of the start number specifying text box 501. If the serial number storage specifying check box 502 is not checked, the value, which is input to the start number specifying text box 501 and its number of digits are stored at the time of completion. At the time of the next startup, the stored value is set as the initial value of the start number specifying text box 501.

Date/time format setting menus 503 are used to set the format of the date and time to be inserted when "photographing date/time" is selected on the filename setting menu 301. In this embodiment, the date/time format setting menus 503 include a pull-down menu used to select the order of "year", "month", and "day", and that used to select how to describe "year", "month", "day", "hour", "minute", and "second". The lower menu allows to set the format of "year", "month", "day", "hour", "minute", and "second". In the example of FIG. 5, the format that expresses each of "year", "month", and "day" by two digits is selected. In this way, the format of the date and time to be inserted can be determined by a combination of values selected from the two pull-down menus.

A delimiter insertion specifying check box 504 allows the user to specify whether or not to insert a delimiter between neighboring setting values upon lining up the values set using the drop-down lists of the filename setting menu 301. When the delimiter insertion specifying check box 504 is not checked, no delimiter is inserted between neighboring setting values. If the delimiter insertion specifying check box 504 is checked, a delimiter is inserted between neighboring setting values. In this embodiment, an underscore "_" is inserted as a delimiter.

A branch number addition specifying check box 505 allows the user to specify whether or not to automatically add serial numbers to avoid conflict of filenames when a plurality of the same filenames are generated if they are generated based on the set rules. If the branch number addition specifying check box 505 is not checked, no special processing is done even when conflict of new filenames has occurred. If the branch number addition specifying check box 505 is checked, serial numbers are automatically added to avoid conflict of new filenames.

The selection items of the basic setting menu 303, format setting menu 304, and the like are not limited to those in the above example, and other items may be added or the items may be changed or deleted. For example, FIG. 11 shows an example in which a photographing date/time serial number setting check box 1101 to the format setting menu 304. If the photographing date/time serial number setting check box 1101 is not checked, no special processing is done. If the photographing date/time serial number setting check box 1101 is checked, when "photographing date/time" and "serial number" are selected on the filename setting menu 301, serial numbers are inserted in turn from the initial value for respective photographing dates of files to be renamed and in ascending order of photographing time.

As described above, the rename processing of the file management apparatus of this embodiment displays a list of filenames of files to be renamed selected in step S201 on the original filename list display window 305. The user can select an arbitrary number of filenames from the filename list using the input device 104. The selected filenames are highlighted. At the same time, new filenames which are generated in correspondence with files selected on the original filename list display window 305 and are displayed on the new filename list display window 306 are highlighted.

The new filename list display window 306 displays a list of new filenames generated in step S202. At this time, the result of error checking done in step S203 (to be described later) is simultaneously displayed on the new filename list display window 306. The display of the new filename list display window 306 is updated every time the rules set on the GUI in FIGS. 3 to 5 are changed or every time files selected on the original filename list display window 305 are changed. In this way, the user can set rules while confirming the rename results in real time.

Upon depression of an execution button 307 on the rename setting window, the file management apparatus executes rename processing. The processing upon execution will be described later using FIG. 8. Upon depression of a cancel button 308, the apparatus aborts the rename processing.

Figure 7:
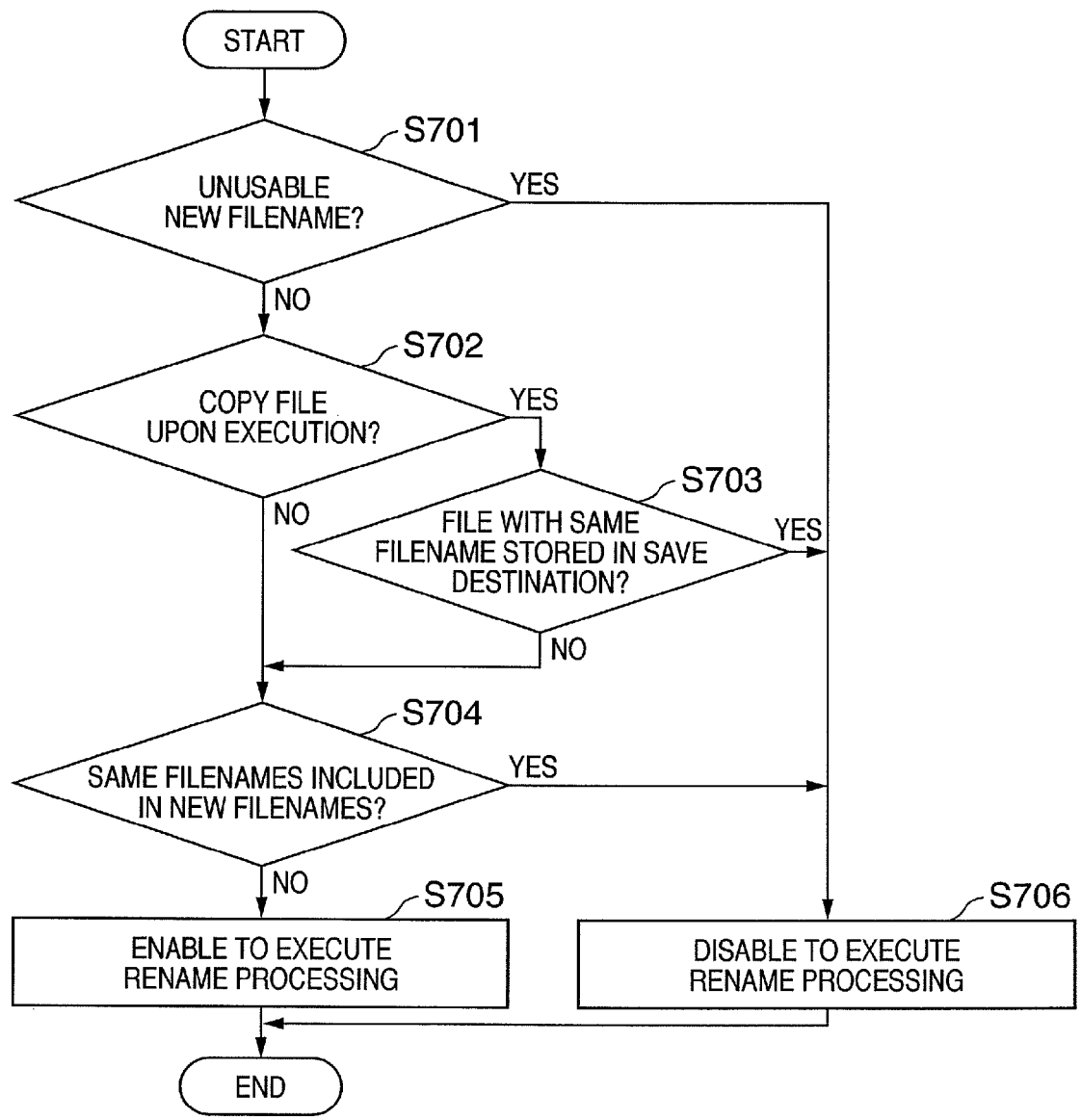
FIG. 7 is a flowchart for explaining details of new filename check processing practiced in step S202 in FIG. 2.

FIG. 7 is a flowchart showing the sequence of the new filename check processing in step S203 in FIG. 2. The following processes in steps S701 to S704 are repeated for all new filenames generated in step S202.

It is checked in step S701 if a new filename complies with the predetermined rules. For example, if a character which is determined by the operating system not to be used in a filename is included, or if the filename starts with a 1-byte space or ".", it is determined that the new filename is unusable, and the flow advances to step S706. Otherwise, it is determined that the new filename is usable, and the flow advances to step S702.

In step S702, the state of the execution time operation selection check box 403 on the basic setting menu 303 is checked, i.e., it is checked if the file to be renamed is to be copied upon execution of the rename processing. If the execution time operation selection check box 403 is checked, the flow advances to step S703; otherwise, the flow advances to step S704.

It is checked in step S703 if a file with the same filename as the new filename is stored in a copy destination folder (save destination folder of the renamed file) specified on the basic setting menu 303 (if a conflict file is stored). If no file with the same filename is stored, the flow advances to step S704; otherwise, it is determined that the new filename is unusable, and the flow advances to step S706.

It is checked in step S704 if the new filenames generated in step S202 include the same filename as the new filename of interest (if they include a conflict filename). If no new filename is included, the flow advances to step S705; otherwise, it is determined that the new filename is unusable, and the flow advances to step S706.

In step S705, since no new filename which are determined to be unusable is found in steps S701 to S704, the execution button 307 is enabled to allow to execute processing.

In step S706, error processing is executed, i.e., if the new filename which is determined to be unusable is found, the execution button 307 is disabled to inhibit processing. Also, as shown in FIG. 12, new filenames which are determined to be unusable are identifiably displayed on the new filename list display window 306. In this way, the user can know the presence/absence of a situation that may cause an error upon execution of the rename processing based on the current settings before execution and in real time, and can appropriately change the settings.

In FIG. 12, new filenames which are determined to be unusable are boxed and displayed. Alternatively, other arbitrary display methods for displaying such new filenames in a color different from other files, flickering them, and the like may be adopted. In addition to simply changing the display method of filenames, the user may be informed of a message dialog or the like that indicates the reason why the new filenames are determined to be unusable. More specifically, the user may be informed that the new filename includes an unusable character, a file with the same filename is stored at the copy destination, a plurality of the same new filenames will be generated based on the current settings, or the like.

Figure 8:
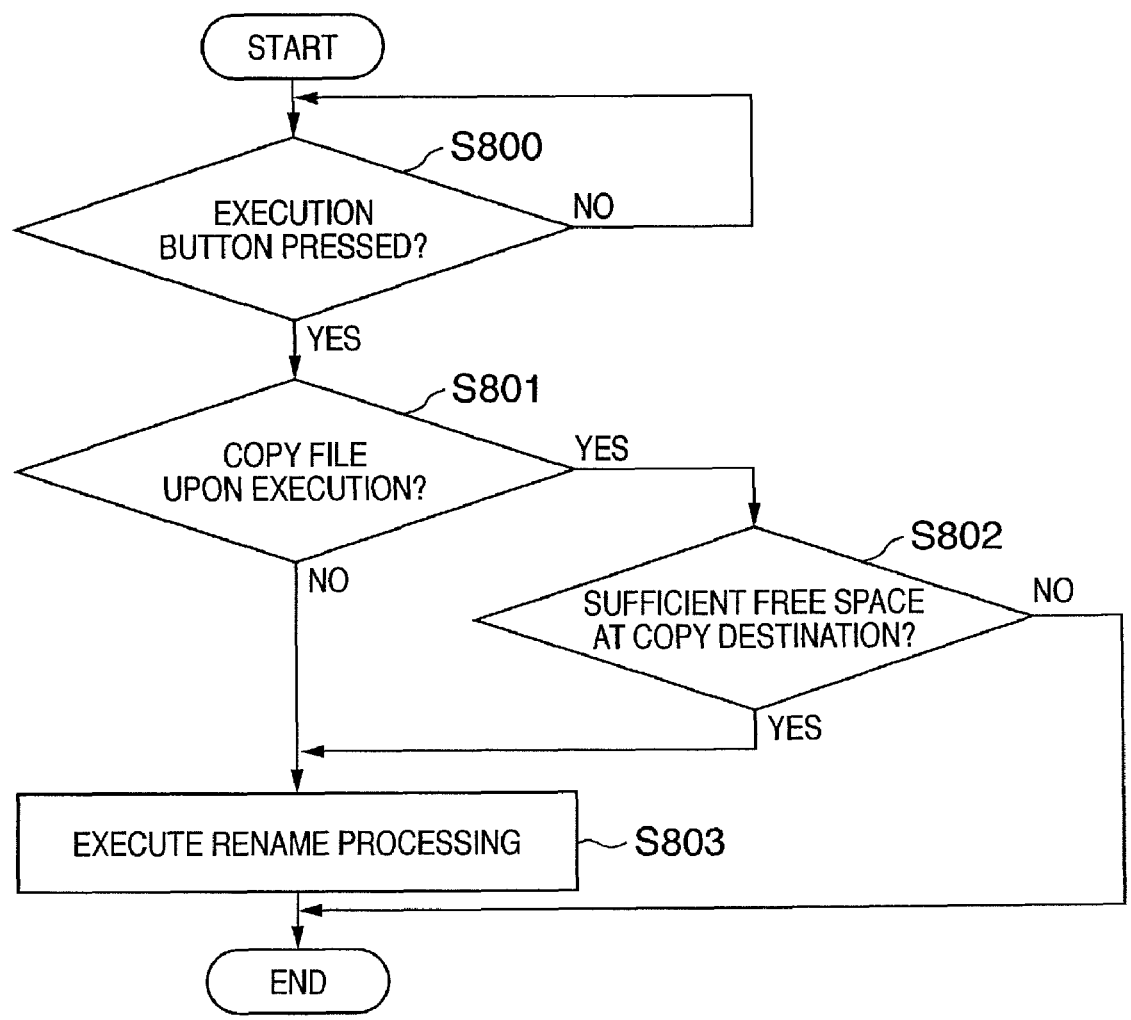
FIG. 8 is a flowchart for explaining details of execution processing practiced in step S204 in FIG. 2.

FIG. 8 is a flowchart showing the sequence of the execution processing done in step S204.

In step S800, the control waits for an execution instruction upon depression of the execution button 307. If the execution instruction is input, the flow advances to step S801. It is checked in step S801 based on the state of the execution time operation selection check box 403 if copy processing is required, as in step S702. If the execution time operation selection check box 403 is not checked, the flow advances to step S803; otherwise, the flow advances to step S802.

In step S802, the free space of the storage device (e.g., the secondary storage device) which includes the copy destination folder is examined, and it is checked if all files to be renamed, which are to be copied, can be copied. If the files can be copied, the flow advances to step S803. If the free space is insufficient, and the files cannot be copied, the processing ends. At this time, a message box that indicates that the free space of the copy destination is insufficient may be displayed. Note that the free space check processing of the storage device that includes the copy destination folder may be executed in, e.g., the new filename check processing. For example, the free space check processing may be done together when the presence/absence of a file with the same filename in the copy destination folder is checked in step S703. In this case, if an insufficient space is detected, the flow immediately advances to step S706 to inform the user of the insufficient free space. Alternatively, even when filename check results are normal after the check processing of all filenames up to step S704 is done, the flow advances to step S706 to display an error message.

In step S803, the filename of the file to be renamed is changed to the new filename generated in step S202. If the execution time operation selection check box 403 is checked, the file to be renamed with the new filename is copied to the specified copy destination folder.

Note that an error may occur when the file to be renamed is moved or deleted after depression of the execution button 307. In this case, after all files that can be normally processed are processed, a message box that indicates the file to be renamed whose processing has failed, and its reason (e.g., the file of interest does not exist) may be displayed.

As described above, according to this embodiment, the file management apparatus which can change filenames presents a new filename to be given to the user before processing. For this reason, the user can confirm before processing if the changed filename is an expected one, and can change settings as needed.

Also, it is checked before processing if a new filename generated according to the rules set by the user is usable without any problems. If a new filename which is determined to be unusable is found, the user is informed of it. For this reason, the user can know the presence/absence of a situation that may cause an error in advance, and can take an appropriate measure beforehand.

<<Second Embodiment>>

The file management apparatus according to the first embodiment is a stand-alone apparatus or application. However, the file management apparatus may operate in collaboration with another apparatus or application. In this case, processing for receiving information of files used in another application, and inhibiting filenames from being renamed to such used filenames may be added. The file management application according to this embodiment is characterized in that it has functions equivalent to those described in the first embodiment, and operates in collaboration with another application.

The basic flow of the rename processing in the file management application of this embodiment and the GUI to be presented to the user can be the same as those described using FIGS. 2 to 5. Therefore, the following description will be given using the same drawings.

Figure 9:
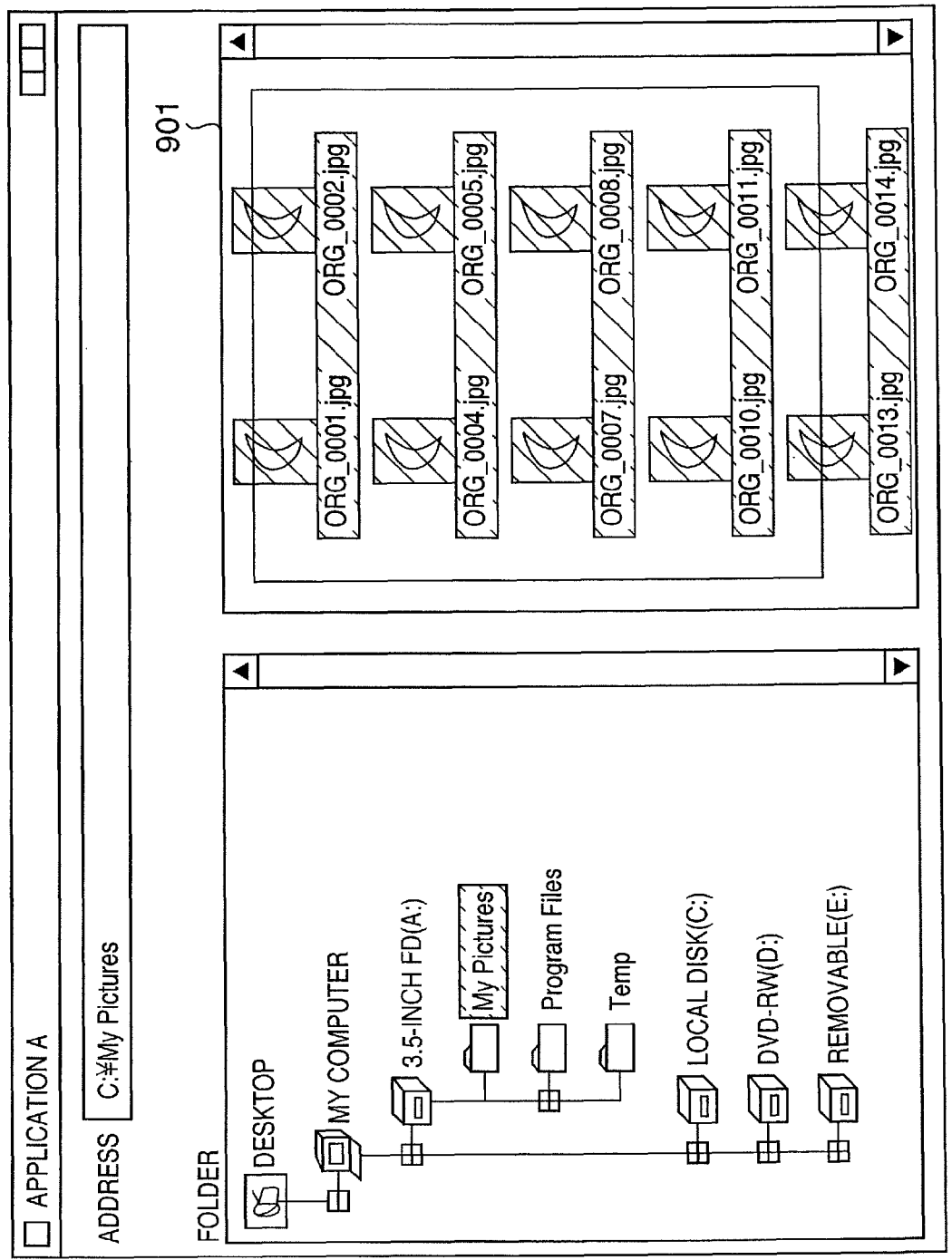
FIGS. 9A and 9B are views showing an example of a method of specifying a file to be renamed in a file management application according to the second embodiment of the present invention.

FIGS. 9A and 9B shows an example of the method of specifying a file to be renamed in step S201 in the file management application according to this embodiment. In this embodiment, the file management application and an application A which displays a file list display window 901 have an interface that can directly exchange arbitrary data with each other. The other application having such interface will be referred to as a collaborative application hereinafter.

In this embodiment, the file list display window 901 used by the user to browse files and a neighboring folder tree window (both shown in FIG. 9A) are provided by the collaborative application A. The file list display window 901 basically has the same functions as the file list display window 602 described using FIG. 6A. Therefore, the user selects a directory (folder) that stores required data by tracing the hierarchical directories by manipulating the folder tree window provided by the collaborative application A. In this manner, the user can display a list of filenames of files included in the selected directory on the file list display window 901.

When the file management application of this embodiment is launched while the file is selected on the file list display window 901, it performs the following operation. The collaborative application A informs the file management application of the filename of the selected file (or the file management application acquires it from the collaborative application A), and that filename is added to the original filename list display window 305 (FIG. 9B). At the same time, a new filename generated based on the set rules is added to the new filename list display window 306.

In this embodiment, the file management application and collaborative application comprise the interface used to exchange data between them. Alternatively, data to be exchanged may be temporarily saved in a file or the like, and they need not be directly exchanged.

In this embodiment, the file management application is launched independently of the collaborative application. Alternatively, the file management application may be launched from the collaborative application. In such case, a specification that disables the operation of the collaborative application upon launching the file management application may be adopted.

The new filename rule setting processing in step S202 in this embodiment is the same as that described using FIGS. 3 to 5 in the first embodiment.

Figure 10:
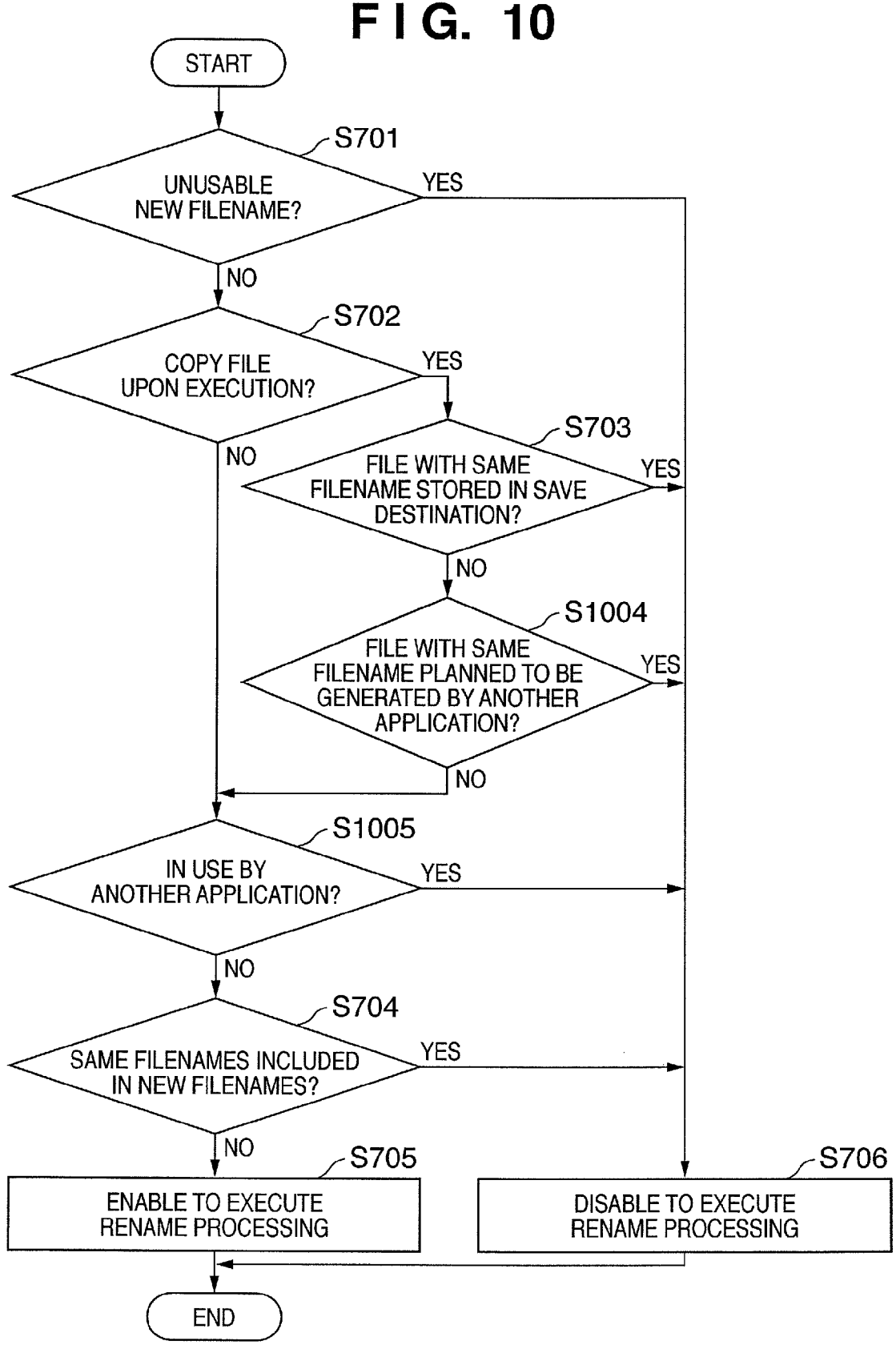
FIG. 10 is a flowchart for explaining details of new filename check processing according to the second embodiment.

FIG. 10 is a flowchart showing the sequence of the new filename check processing in step S203 in this embodiment. This check processing is repeated for all new filenames generated in step S202 in this embodiment. Note that the same reference numerals in FIG. 10 denote the same processes in FIG. 7 described in the first embodiment, and a repetitive description thereof will be avoided.

In steps S701 to S703, it is checked if the filename satisfies the rules, if file copy processing is required upon renaming, and if a file with the same filename as the filename of interest exists in the copy destination folder, as has been explained in the first embodiment. If the filename does not satisfy the rules and if a file with the same filename as the filename of interest exists in the copy destination folder, it is determined that the new filename is unusable, and the flow advances to step S706.

This embodiment is different from the first embodiment in that:

when the file to be renamed is in use by the collaborative application, or when a file with the same filename as the new filename is about to be generated in the same target folder by the collaborative application, it is determined and processed that the new filename is unusable.

If it is determined in step S703 that no file with the same filename as the new filename exists in the copy destination folder (no conflict occurs), the flow advances to step S1004. It is then checked if the collaborative application plans to generate a file with the same filename as the new filename in the copy destination folder. This checking processing can be implemented as follows. For example, the collaborative application directly passes a list of filenames to be generated to the file management application first. The file management application checks if the same filename as the new filename is included in the received list of filenames.

Alternatively, the collaborative application may generate a list of filenames to be generated in a folder where it generates files, and the file management application of this embodiment may refer to that list. If no file of the same filename as the new filename is planned to be generated, the flow advances to step S1005. If a file of the same filename as the new filename is planned to be generated, it is determined that the new filename is unusable, and the flow advances to step S706.

It is checked in step S1005 if the file to be renamed is in use by the collaborative application. This checking processing can be done as follows. For example, the collaborative application directly passes a list of filenames in use to the file management application of this embodiment. Then, the file management application checks if the file to be renamed is included in the received list of filenames.

Alternatively, the collaborative application may generate a list of filenames in use, and the file management application of this embodiment may refer to that list. If the file to be renamed is not in use, the flow advances to step S704. If the file to be renamed is in use, it is determined that the new filename for the file in use is unusable, and the flow advances to step S706.

The subsequent processes in steps S704 to S706 are as has been described in the first embodiment. In the error processing in step S706, the user is also notified of the file in use by the collaborative application or the same filename as that of a file to be generated by the collaborative application unlike in the first embodiment.

The sequence of the execution processing in step S204 in this embodiment is the same as that described using FIG. 8 in the first embodiment, and a description thereof will be omitted.

According to this embodiment, even when the file is in use by the collaborative application, or when the collaborative application is about to generate a file with the same filename, it is determined that the new filename is unusable, and the user is notified of it. For this reason, in addition to the effects of the first embodiment, occurrence of errors upon execution can be further reduced.

<<Other Embodiments>>

The present invention includes a case wherein the equivalent functions are achieved by executing a software program that implements the functions of the aforementioned embodiments by a system including a computer or a computer of an apparatus. The program is supplied, to the system including the computer or the computer, directly from a recording medium or using wired/wireless communications.

Therefore, the program code itself supplied to and installed in the computer to implement the functional processing of the present invention using the computer implements the present invention. That is, the present invention includes the computer program itself for implementing the functional processing of the present invention.

In this case, the form of the program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like may be used. Also, optical/magneto-optical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, the following method may be used. That is, in this method, a server on a computer network may store a data file (program data file) that can be a computer program which forms the present invention on a client computer. Then, the program data file is downloaded to a client computer that establishes connection to the server. In this case, the program data file may be segmented into a plurality of segment files, which may be allocated on different servers. As the program data file, the computer program itself that forms the present invention, a compressed file including an automatic installation function, or the like may be used.

That is, the present invention includes a server apparatus which makes a plurality of users download the program data file for implementing the functional processing of the present invention on a computer.

Also, the program may be supplied as follows. That is, a storage medium such as a CD-ROM or the like, which stores the encrypted program of the present invention, may be delivered to the user, and the user who has cleared a predetermined condition may be allowed to download key information that is used to decrypt the encrypted program via the Internet. In this case, the encrypted program may be executed using that key information to be installed on a computer, thus implementing the present invention.

The functions of the aforementioned embodiments may be implemented not only by executing the readout program code by the computer but also using other programs. For example, the functions of the aforementioned embodiments can be implemented when an OS or the like running on the computer executes some or all of actual processing operations on the basis of an instruction of that program.

Furthermore, the functions of the aforementioned embodiments may be implemented by executing the program read out from the recording medium by a function extension board or a function extension unit, which is inserted in or connected to the computer. More specifically, a memory and CPU of the function extension board or function extension unit execute the program to assume some or all of actual processes.

As described above, according to the present invention, a plurality of files which have the same filename except for their extensions are grouped, and are renamed to have the same filename except for their extensions. For this reason, the present invention can support a case wherein a plurality of files such as RAW data and JPEG data of an identical photograph image must be handled together.

Since conflict of a new filename is checked using a filename which is in use by another collaborative application or the filename of a file which is planned to be generated by such application, an error which may occur when different applications use an identical file can be prevented.

Furthermore, every time the rules are changed, new filename generation processing and error check processing are executed, and the result is displayed on a preview window. Hence, the user can set rules while confirming the result, and occurrence of an error can be prevented.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-023932 filed on Jan. 31, 2005, which is hereby incorporated by reference herein in its entirety.

What is claimed is:

1. A file management apparatus that operates by executing a file management application, the apparatus comprising:
   a file selection unit configured to select a plurality of files;
   a generation unit configured to generate new filenames of the plurality of files selected by said file selection unit in accordance with predetermined rules;
   a generation list acquisition unit configured to acquire a generation list and a used filename list, wherein the generation list is a list of filenames to be generated by a collaborative application and the used filename list is a list of filenames being used by the collaborative application, and wherein the collaborative application is different from the file management application;
   a determination unit configured to determine whether any of the new filenames generated by the generation unit are included in at least one of the generation list and the used filename list;
   a display unit configured to display, from among the new filenames generated by the generation unit, a new filename determined as being included in at least one of the generation list and the used filename list so that a list that includes the new filename is distinguishable; and
   a character determination unit configured to check whether any of the new filenames include a character not to be used, and
   wherein the display unit is further configured to display, from among the new filenames generated by the generation unit, a filename including the character not to be used in a manner that is distinguishable.

2. The file management apparatus according to claim 1, further comprising a control unit configured to, if at least one of the new filenames is determined by the determination unit as being included in at least one of the generation list and the used filename list, control the file management apparatus not to accept an instruction to execute a rename processing of the plurality of files using the new filenames.

3. A method of controlling a file management apparatus that operates by executing a file management application, the method comprising:
   selecting a plurality of files;
   generating new filenames of the selected plurality of files in accordance with predetermined rules;
   acquiring a generation list and a used filename list, wherein the generation list is a list of filenames to be generated by a collaborative application and the used filename list is a list of filenames being used by the collaborative application, and wherein the collaborative application is different from the file management application;
   determining whether any of the new filenames are included in at least one of the generation list and the used filename list;
   checking whether any of the new filenames include a character not to be used;
   displaying from among the new filenames generated in the generating step, a new filename determined as being included in at least one of the generation list and the used filename list so that a list that includes the filename is distinguishable; and
   displaying, from among the new filenames generated in the generation step, a filename including the character not to be used in a manner that is distinguishable.

4. A non-transitory computer-readable storage medium which retrievably stores a computer-executable program that controls a computer to function as a file management apparatus according to claim 1.

* * * * *